Nov. 22, 1932.   E. G. K. ANDERSON   1,888,342

HANGER

Filed June 1, 1931   2 Sheets-Sheet 1

Inventor:
E. G. K. Anderson,
By Wm. F. Freudenreich,
Attorney.

Nov. 22, 1932. E. G. K. ANDERSON 1,888,342
HANGER
Filed June 1, 1931  2 Sheets-Sheet 2
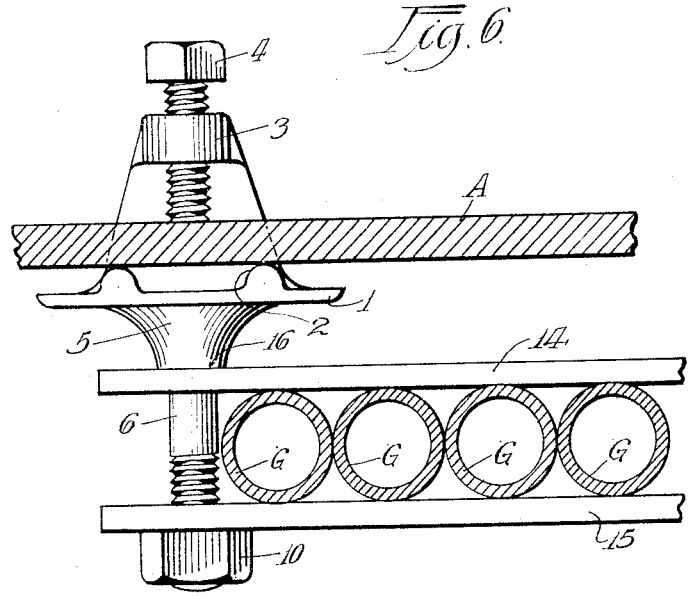
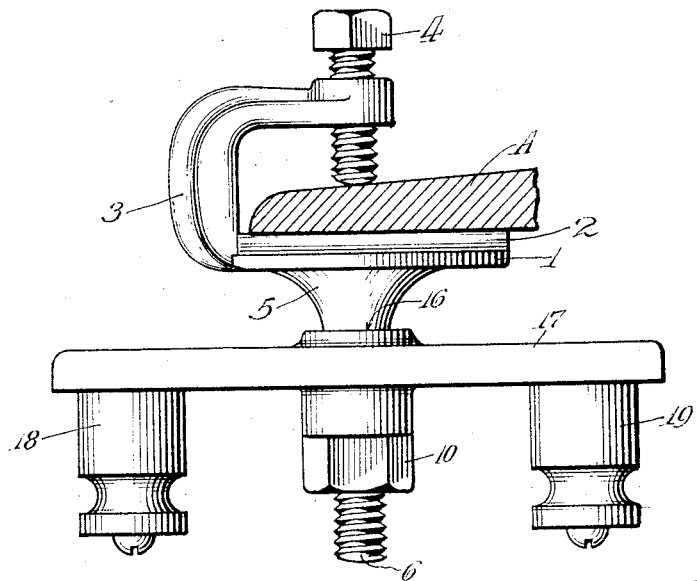
Inventor:
E. G. K. Anderson,
By Wm. F. Freudenreich
Attorney.

Patented Nov. 22, 1932

1,888,342

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

HANGER

Application filed June 1, 1931. Serial No. 541,345.

The primary object of the present invention is to produce a simple and novel pipe hanger that may quickly and easily be attached to the flange of a structural steel beam or the like and support a pipe approaching at any angle.

In carrying out my invention, I employ a clamp comprising a table member and an overlying arm provided with means to clamp the supporting flange or member between it and the table. From the under side of the table projects a screw stud upon which may be slipped a clamping jaw held up by a nut on the stud; the clamping jaw cooperating with the table to clamp a pipe extending underneath the table from any direction. The clamping jaw may be double-ended so as to clamp two pipes at a time, and it may be so designed that it will serve to hold either two pipes of the same size or two pipes differing in diameter. Also, two of the hangers may be employed in spaced relation to each other, the distance between them being spanned by clamping bars slipped on the studs in lieu of the ordinary clamping jaws, whereby any desired number of pipes may be supported. Furthermore, the hanger may be utilized to support a holder or arm adapted to carry conductors or the like, this holder or arm being simply slipped on the stud in the same manner as the pipe clamping jaw.

It will thus be seen that, considered in one of its aspects, my invention may be said to have for its object to produce a simple and novel pipe hanger that lends itself readily to a variety of uses by simply substituting for one of the elements a different element.

Figure 1:
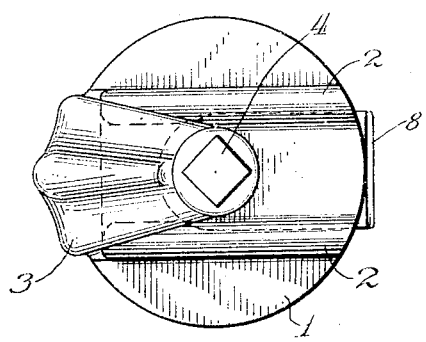
Figure 4:
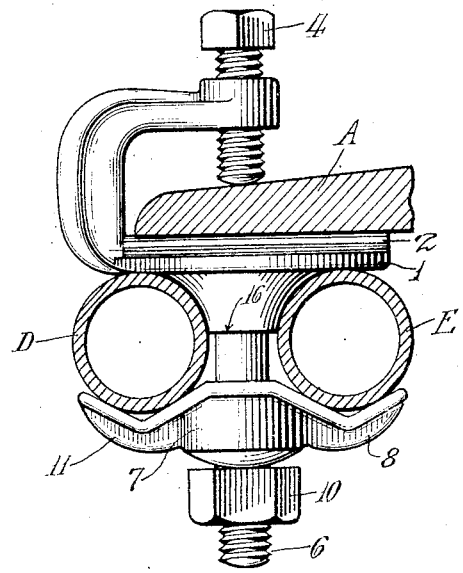
Figure 2:
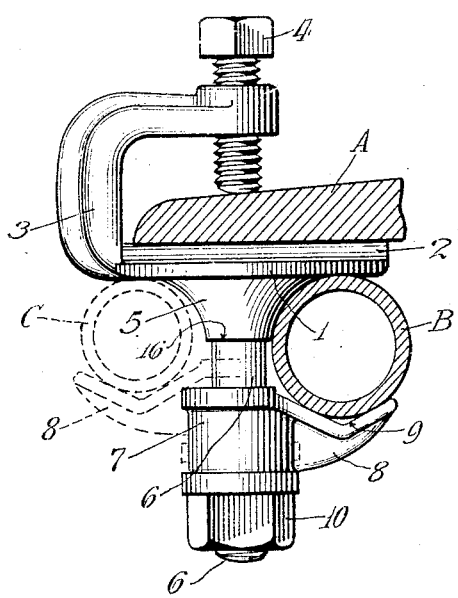
Figure 5:
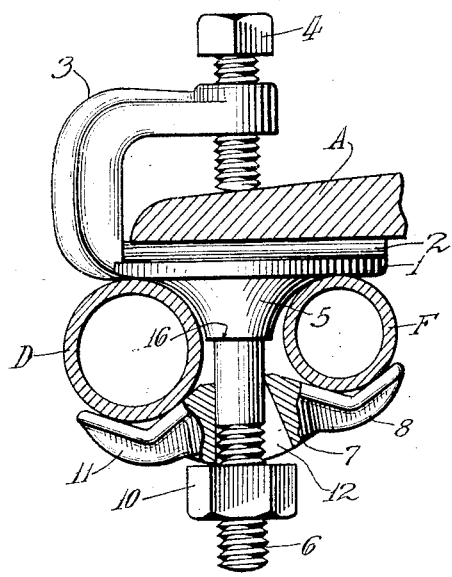
Figure 3:
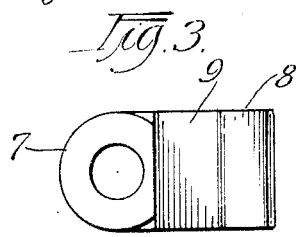

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of one of my improved hangers in one of its simpler forms; Fig. 2 is a vertical section through the flange of a horizontal metal beam on which my improved hanger is mounted, showing in full and dotted lines pipes of different sizes supported in different positions by the hanger; Fig. 3 is a top plan view of the detachable pipe clamping jaw of the hanger shown in Figs. 1 and 2; Fig. 4 is a view similar to Fig. 2, showing a modified form of clamping jaw supporting two pipes of equal diameter; Fig. 5 is a view similar to Fig. 4 showing two pipes of different diameters held in the hanger, a fragment of the detachable clamping jaw being broken away; Fig. 6 is an elevation of the hanger shown as supporting one end of each of a pair of clamping bars between which a row of pipes, arranged side by side, are held, a supporting flange or the like for the hanger being shown in section; and Fig. 7 is a view similar to Figs. 2, 4 and 5, showing the hanger provided with a holder or arm carrying insulators by which conductors or the like are adapted to be supported.

Referring to Figs. 1, 2 and 3 of the drawings, 1 represents a circular table adapted to be placed underneath and engage with the flange of an I-beam or other member. If desired, the top of the table may be provided with a pair of parallel raised elements or ribs 2, 2, lying on opposite sides of the center, whereby the table top will make contact with the under face of the supporting flange along two lines only. Rising from the edge of the table is a heavy rigid arm 3 which first extends upwardly and then inwardly across the table to about the middle thereof. Screwed into the free end of this arm is a heavy set screw 4 whose long axis is at right angles to the table. The table and the arm form a C-clamp against the broad face of one arm of which the supporting flange is pressed by the set screw. On the bottom of the table is a large central boss 5, circular in cross section and decreasing in diameter from the top toward the bottom. The shape of the boss is preferably such that its periphery forms the inner half of an inverted annular trough, semi-circular in cross section. In other words, the boss is so shaped that, when a pipe of a predetermined diameter is placed against it while lying at right angles to the long central axis of the boss, and approaching the boss from any direction angularly of the boss, it will seat itself in the curvature of the boss. From the bottom of the boss depends a long screw-threaded stud 6. Where only a single pipe is to be supported, a single clamping jaw is employed. This clamping jaw may conveniently consist of a tubular or hub-like member 7 that can be slipped freely on and off the stud; the member 7 having a radially projecting arm 8. This arm is preferably provided in its upper face with a seat for a pipe. In the arrangement shown, this seat is a V-shaped depression 9 extending across the width of the arm. When a pipe, such as indicated at B in Fig. 2, is to be hung, it is placed under the table, against the boss, as shown in Fig. 2, and the clamping jaw is forced up against the under side of the pipe by means of a nut 10 screwed upon the lower end of the stud; the clamping jaw being so positioned that the pipe rests in the seat in the jaw. If the pipe be smaller in diameter than the pipe B, as illustrated in dotted lines at C in Fig. 2, the jaw is simply moved farther up along the stud. The dotted line position of the jaw in Fig. 2 not only illustrates the application of the device to a smaller pipe than the pipe B, but also shows that a pipe need not always be in the same position in order for the hanger to receive it. In other words, the clamping jaw is a comparatively narrow arm that may be swung angularly about the stud so as to adapt itself to the direction at which the pipe approaches.

In Figs. 4 and 5, there is shown a modification in which all of the parts of the hanger are like those heretofore described, excepting only the clamping jaw which is made double-ended and has, in addition to the arm 8, a second arm 11 diametrically opposite the arm 8. The center hole 12 in this clamping jaw is preferably tapered, at least in one transverse dimension, so as to permit the jaw to stand at right angles to the stud, as shown in Fig. 4, for the purpose of supporting two pipes D and E of the same diameter; or, if one of the pipes, as indicated at F, in Fig. 5, is smaller in diameter than the other pipe, permitting the jaw to tilt and thus enable the jaw to exert an equal upward pressure on both pipes.

Sometimes an entire battery of pipes, consisting of a series of pipes lying side by side, must be hung. In that event, two of the body members of the hanger may be clamped to the supporting flange at the proper distance apart, the space between the two studs being bridged by a pair of bars between which the pipes are clamped. In Fig. 6, one side of such a compound hanger is shown, there being two bars 14 and 15 extending from one stud to the other. It will be seen that the bars are provided with openings that permit them to be slipped on the studs. The pipes, indicated at G, are laid side by side between the bars. When the nuts are screwed upon the studs, they press the lower bar up against the pipes, these pipes in turn pressing up on the upper bar which encounters shoulders 16 at the bases of the studs and, therefore, serves as a stationary clamping element.

In Fig. 7, I have shown a cross arm 17 slipped on the stud of one of my improved body members; the nut forcing the cross arm against the shoulder 16. At the ends of the cross arm are insulators 18 and 19 to which conductors may be attached.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

A hanger comprising a round table flat on the top to fit against the under side of a structural beam or the like, an arm extending up at one edge of the table and then across the top to the middle, a set screw passing through the free end of the arm at right angles to the top of the table, the table having on the under side a central boss flat on the bottom, the boss decreasing in diameter from the top toward the bottom and having the contour of the inner half of an inverted annular trough semi-cylindrical in cross section, a stud smaller in diameter than the lower end of the boss depending from the lower end of the boss, a holder loose on the stud, and a nut screwed on the lower end of the stud to secure the holder thereon.

In testimony whereof, I sign this specification.

ERNST G. K. ANDERSON.